US007949631B2

(12) United States Patent
Faunce et al.

(10) Patent No.: US 7,949,631 B2

(45) Date of Patent: May 24, 2011

(54) TIME-BASED REBUILDING OF AUTONOMIC TABLE STATISTICS COLLECTIONS

(75) Inventors: Michael S. Faunce, Rochester, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1611 days.

(21) Appl. No.: 11/044,753

(22) Filed: Jan. 27, 2005

(65) Prior Publication Data

US 2006/0167914 A1 Jul. 27, 2006

(51) Int. Cl.
*G06F 7/00* (2006.01)
*G06F 17/00* (2006.01)

(52) U.S. Cl. ........................................................ 707/610

(58) Field of Classification Search ........................ None
See application file for complete search history.

(56) References Cited

U.S. PATENT DOCUMENTS

2004/0243555 A1* 12/2004 Bolsius et al. .................... 707/3
2005/0086242 A1* 4/2005 Ngai et al. .................... 707/100
2005/0086263 A1* 4/2005 Ngai et al. ................ 707/104.1
2005/0203940 A1* 9/2005 Farrar et al. .................. 707/102

* cited by examiner

*Primary Examiner* — Neveen Abel-Jalil
*Assistant Examiner* — Raheem Hoffler
(74) *Attorney, Agent, or Firm* — Wood, Herron & Evans, LLP

(57) ABSTRACT

Building database statistics for use by a query optimizer is beneficial but may over utilize system resources. Accordingly, the frequency that statistics are rebuilt is controlled in order to minimize the effect of the system. In particular, the staleness of the data and the time since the last statistics collection are used to determine whether or not to re-collect statistics. Even for relatively stale data, statistics are not rebuilt until a predetermined time period has passed.

15 Claims, 4 Drawing Sheets

TIME-BASED REBUILDING OF AUTONOMIC TABLE STATISTICS COLLECTIONS

FIELD OF THE INVENTION

The invention relates to database management systems, and in particular, to statistics collection for query optimization.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

In one particular instance, many database management systems collect statistics regarding query execution, typically on a table-by-table basis. These statistics are then used by a query optimizer when optimizing future queries. Even though these statistic collection applications may run in the background, they consume valuable system resources. Furthermore, when the data stored in a table changes, the statistics collected for that table tend to become stale, and not as useful for the purposes of query optimization. Conventional techniques for statistics collections usually define a "staleness" threshold such that if the data in a table is over 15% stale, for example, then new statistics are collected for that table.

One problem that arises in highly volatile tables, however, is that data may become stale (due to inserts, deletions, and updates) very frequently and result in statistics being rebuilt for such tables hundreds of time per hour. The overhead associated statistics collections thus increases and reduces system performance. Increasing the staleness threshold to decrease the frequency of rebuilds adversely impacts tables that are not as volatile. Some database designs require administrators to manually mark specific tables as "volatile" to disable statistics collections on those tables. In such instances, however, optimization suffers due to statistics being missing or overly stale absent further manual intervention by an administrator.

Thus, there is a need in current database systems to have a more flexible approach to statistics collections that more efficiently utilizes system resources.

SUMMARY OF THE INVENTION

Embodiments of the present invention include a database engine and optimizer framework that consider other factors instead of merely data staleness to determine when new statistics should be collected for a database table to help with query optimization. One aspect of the present invention relates to a method for collecting database statistics. In accordance with this method, a level of staleness for data associated with a previous set of database statistics is calculated and a time when the previous set of database statistics were collected is identified. The decision whether to collect new database statistics is based on both the level of staleness and the time.

DETAILED DESCRIPTION

As mentioned above, the embodiments discussed hereinafter utilize a database engine and optimizer framework that support using both time and data staleness to determine how often to re-collect statistics. A specific implementation of such a database engine and optimizer framework capable of supporting this functionality in a manner consistent with the invention will be discussed in greater detail below. However, prior to a discussion of such a specific implementation, a brief discussion will be provided regarding an exemplary hardware and software environment within which such an optimizer framework may reside.

Figure 1:
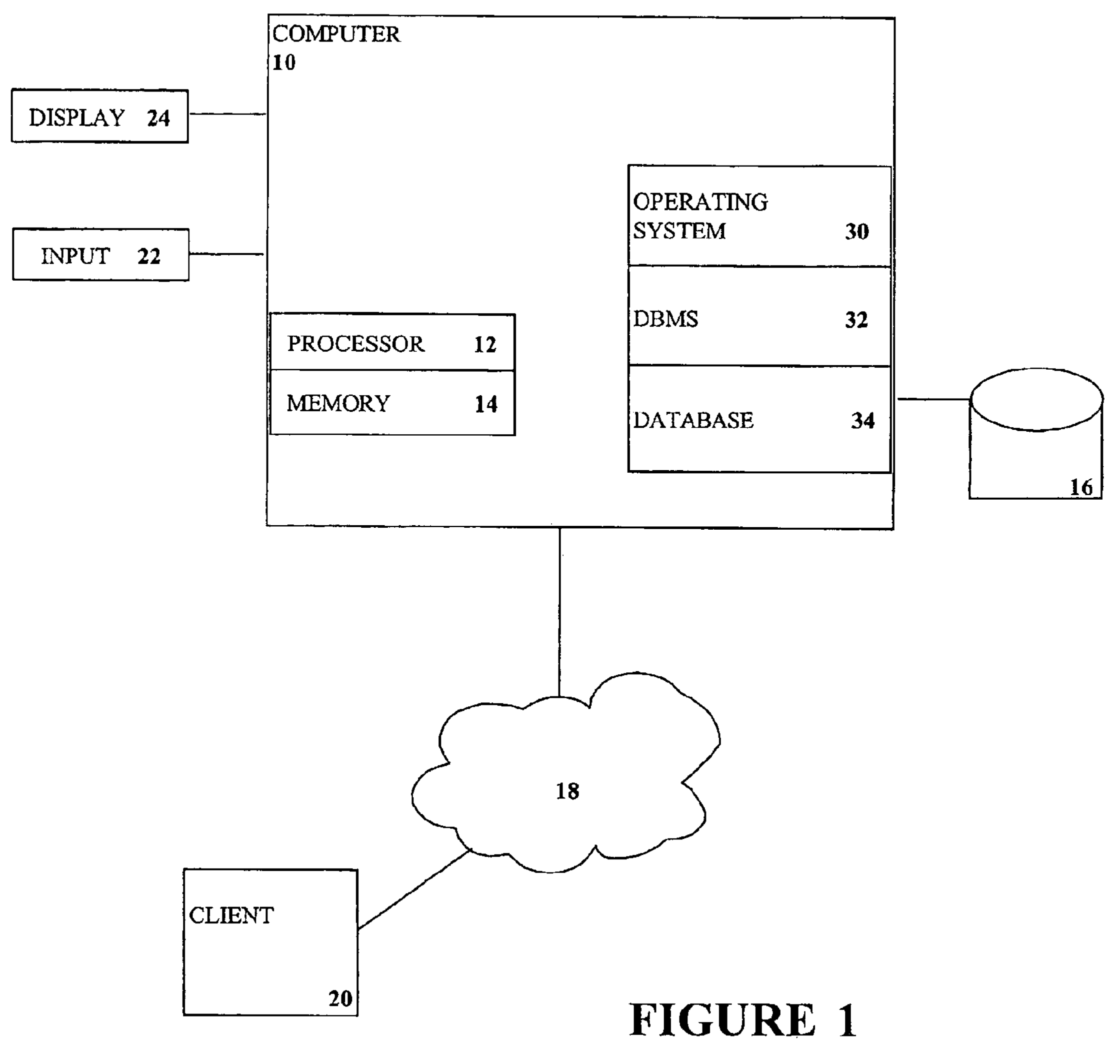
FIG. 1 is a block diagram of a networked computer system incorporating a database management system consistent with the invention.

Turning now to the Drawings, wherein like numbers denote like parts throughout the several views, FIG. 1 illustrates an exemplary hardware and software environment for an apparatus 10 suitable for implementing a database management system that uses both time and data staleness to determine when to collect statistics. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 and database 34, among others). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

Figure 2:
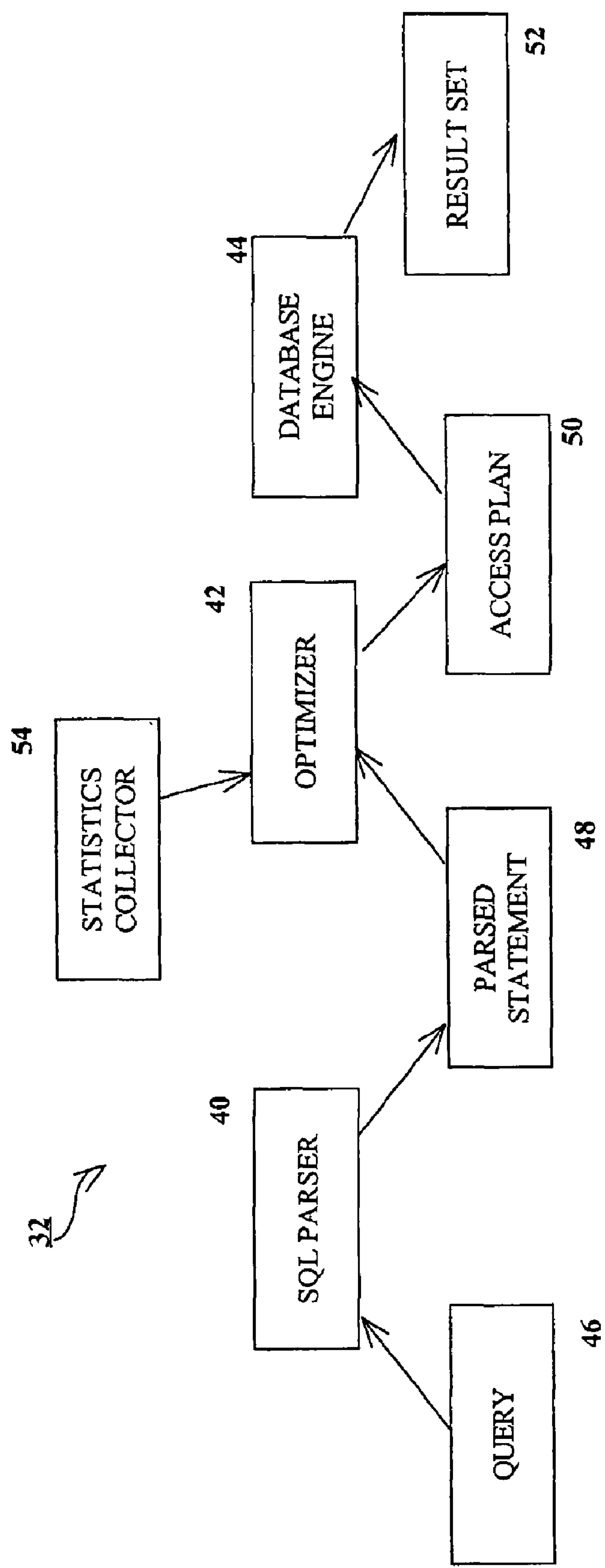
FIG. 2 is a block diagram illustrating the principal components and flow of information therebetween in the database management system of FIG. 1.

Turning briefly to FIG. 2, an exemplary implementation of database management system 32 is shown. The principal components of database management system 32 that are relevant to query optimization are an SQL parser 40, optimizer 42 and database engine 44. SQL parser 40 receives from a user a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated, often using data such as platform capabilities, query content information, etc., that is stored in database 34. Once generated, the execution plan is forwarded to database engine 44 for execution of the database query on the information in database 34. The result of the execution of the database query is typically stored in a result set, as represented at block 52. One additional aspect of the database management system 32 is a statistics collection tool 54 that runs in the background to collect statistics for the query optimizer 42.

Other components may be incorporated into system 32, as may other suitable database management architectures. Other database programming and organizational architectures may also be used consistent with the invention. Therefore, the invention is not limited to the particular implementation discussed herein.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

DBMS 32 performs query optimization based on statistical information about data in the underlying database. Out-of-date statistical information may lead to inefficient query processing in the system. Typical optimizer statistics are a collection of data that describe more details about the database and the objects in the database. These statistics are used by the query optimizer to choose the best execution plan for each SQL statement. Optimizer statistics may include but are not limited to the following:

Table statistics
Number of rows
Number of blocks
Average row length
Column statistics
Number of distinct values (NDV) in column
Number of nulls in column
Data distribution (histogram)
Frequent Values List (FVL)
Index statistics
Number of leaf blocks
Levels
Clustering factor
System statistics
I/O performance and utilization
CPU performance and utilization One of ordinary skill will recognize that other statistics may be utilized as well.

Figure 3:
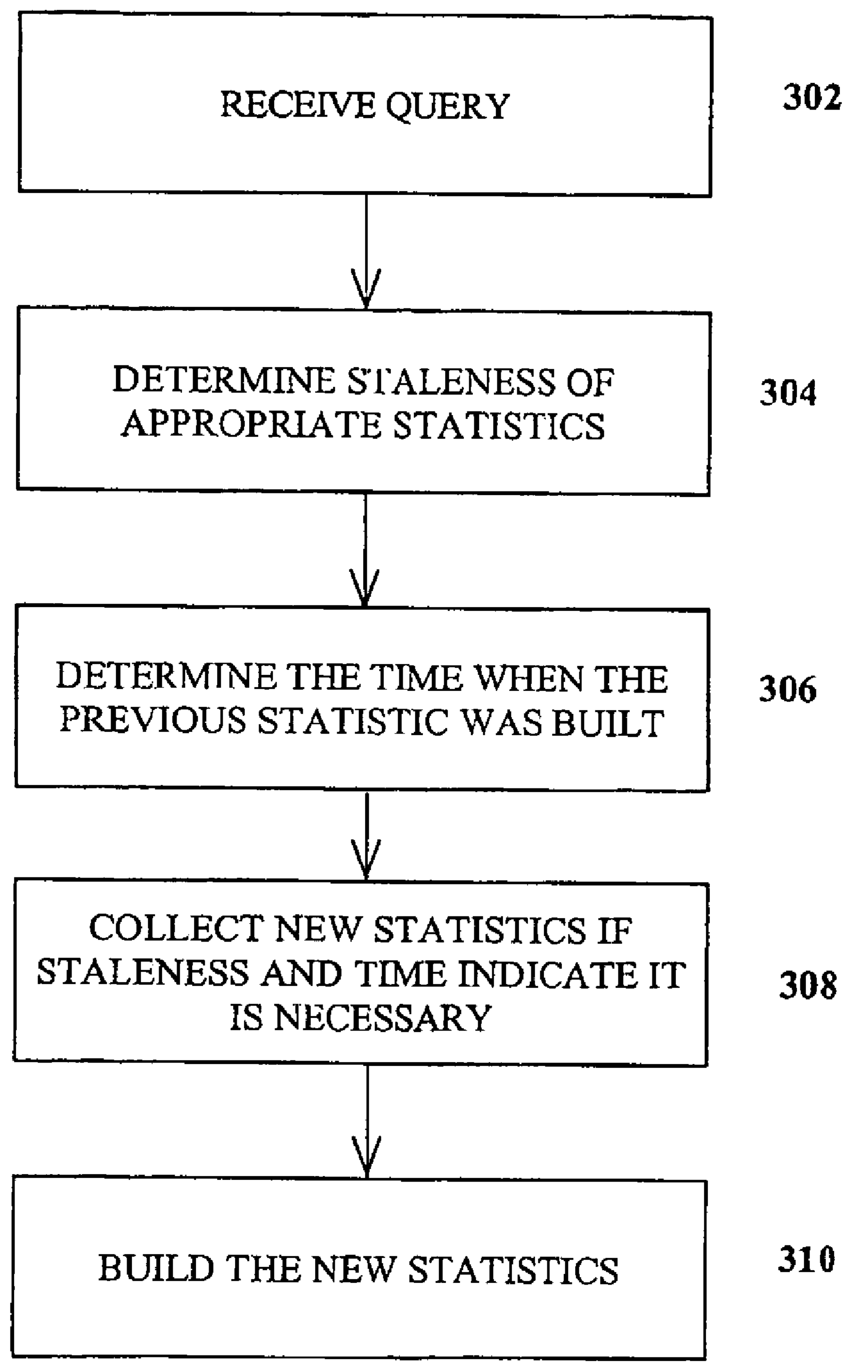
FIG. 3 illustrates a flowchart of an exemplary method for collecting table and query statistics in accordance with the principles of the present invention.

FIG. 3 illustrates a flowchart of an exemplary method for collecting table and query statistics in accordance with the principles of the present invention. In step 302, a query is received that will result in an access of one or more tables. As mentioned above, the query optimizer will rely on collected statistics when developing an access plan to satisfy the query.

In step 304, the query optimizer determines the staleness of the data that is associated with the current statistics that are available. The staleness of data can reflect a number of different factors but typically refers to the data in a table that has changed due to insertions, deletions, or updates. In certain embodiments of the present invention, the staleness of one column of the table may be used as a measure of staleness or, in alternative embodiments, the level of staleness of the entire table may be considered. The conventional measure of staleness is measured as a percentage. For example, if 15 out of 100 data items have changed then the data is considered to be 15% stale. In terms of databases, staleness can exceed 100% in that a single data item may be changed multiple times. Various measures of staleness, e.g., as a percentage, as an absolute or relative value, etc. may be used in a determination of whether a table is stale consistent with the invention.

Because the statistics help the query optimizer determine how to develop the access plan, as the data becomes more stale, the statistics become less useful. Rebuilding statistics will solve the problem but will consume considerable system resources when data is constantly changing.

Figure 4:
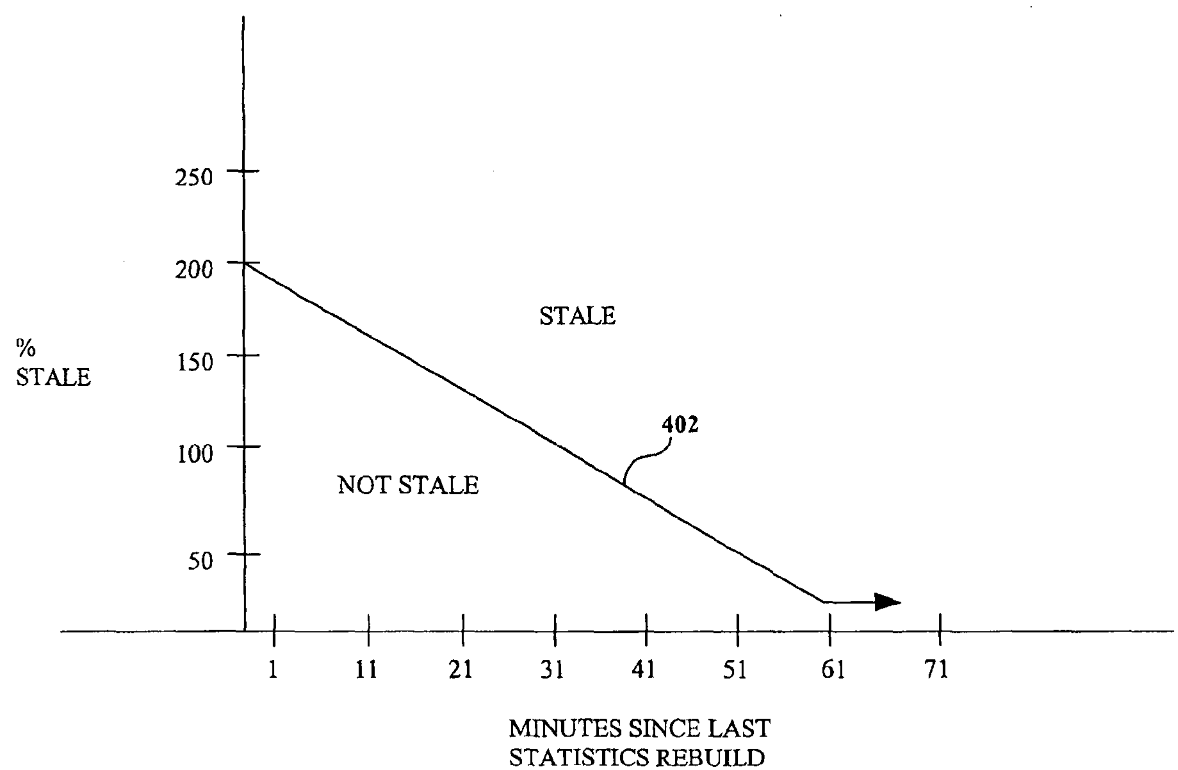
FIG. 4 illustrates an exemplary method for using time and staleness to determine when to collect statistics in accordance with an embodiment of the present invention.

In step 306, the query optimizer determines the time when the currently available statistics relevant to the current query were collected. The time may be an absolute value, or may be based upon the length of time since the last collection of statistics. Next, in step 308, the optimizer determines whether or not to collect new statistics based on both the time that has expired since the previous collection and the level of staleness of the data. Utilizing both factors, the frequency at which statistics are collected can be reduced. FIG. 4 illustrates one example formula for utilizing both time and staleness to determine whether to re-collect statistics.

The Y-axis represents the "% of staleness", while the X-axis represents the "Minutes Since Last Rebuild". According to the graph, data points above the line 402 represent when new statistics should be collected while data points below the line represent when no collection of statistics is warranted. One of ordinary skill will recognize that the graph of FIG. 4 is exemplary in nature and other formulas can be used without departing from the scope of the present invention. In its broadest aspects, the graph of FIG. 4 represents that both time and staleness are a consideration when determining whether or not to collect new database statistics for use by a query optimizer.

By way of explanation, if the data is 200% stale but only a minute has passed, new statistics are warranted. At the other end of the graph, if the data is 15% stale, then new statistic are warranted once more than an hour has passed since the previous statistics were collected. Between those two points, the time and the staleness inversely affect the determination whether or not to collect new statistics.

Returning to FIG. 3, in steps 308 and 310, new statistics are collected and built if the time and staleness determinations indicate the need to do so.

It should be noted that the routine of FIG. 3 performs statistics collection in connection with processing a query. In other embodiments, statistics collection may be a background process, and as a result, the operations of analyzing a table for staleness, checking the time since the last collection, and/or determining whether to rebuild the statistics for a table may occur separate of processing any query.

Various modifications may be made to the illustrated embodiments without departing from the spirit and scope of the invention. For example the terms column, row, field, table and value are usually used in connection with relational databases. However, these terms are not meant to limit the present invention to relational databases as these terms may be used in general to describe like entities in other types of databases such as, for example, object-oriented databases and flat file structures. Therefore, the invention lies in the claims hereinafter appended.

What is claimed is:

1. A method for collecting database statistics comprising the steps of:
calculating a level of staleness of data associated with a previous set of database statistics;
identifying a time when the previous set of database statistics were collected;
determining to collect new database statistics based on the level of staleness and the time; and
if so determined, collecting new database statistics;
wherein the step of determining further includes the steps of:
determining a percentage of data that has changed in a database table;
determining how much time has expired since the time when the previous set of database statistics were collected; and
applying a formula based on the percentage and how much time when determining to collect new database statistics, wherein the formula provides that as the time that has expired increases, the percentage decreases when determining whether to collect new database statistics.

2. The method of claim 1, wherein the level of staleness corresponds to a percentage of data that has changed in a database table.

3. The method of claim 1, wherein the level of staleness corresponds to a percentage of data that has changed in a column of a database table.

4. The method of claim 1, wherein at a first criteria, if the percentage is substantially 200% and the expired time is substantially 1 minute, then new statistics are collected.

5. The method of claim 4, wherein at a second criteria if the percentage is substantially 15% and the expired time is substantially 60 minutes, then new statistics are collected.

6. The method of claim 5, wherein the formula varies linearly between the first criteria and the second criteria.

7. The method of claim 1, wherein the new database statistics include one or more of: number of rows; number of blocks; average row length; number of distinct values (NDV) in a column; number of nulls in a column; data distribution (histogram); number of leaf blocks; levels; clustering factor; I/O performance and utilization; CPU performance and utilization; and a frequent values list.

8. An apparatus for collecting database statistics, the apparatus comprising:

at least one processor;

a memory coupled with the at least one processor; and a program code residing in the memory and executed by the at least one processor, the program code configured to:

calculate a level of staleness for data associated with a previous set of database statistics;

identify a time when the previous set of database statistics were collected; and determine whether to collect new database statistics based on the level of staleness and the time;

wherein the program code is further configured to:

determine a percentage of data that has changed in a database table;

determine how much time has expired since the time when the previous set of database statistics were collected; and apply a formula based on the percentage and how much time when determining to collect new database statistics, wherein the formula provides that as the time that has expired increases, the percentage decreases when determining whether to collect new database statistics.

9. The apparatus of claim 8, wherein the level of staleness corresponds to a percentage of data that has changed in a database table.

10. The apparatus of claim 8, wherein the level of staleness corresponds to a percentage of data that has changed in a column of a database table.

11. The apparatus of claim 8, wherein the formula provides that, at a first criteria, if the percentage is substantially 200% and the expired time is substantially 1 minute, then new statistics are collected.

12. The apparatus of claim 11, wherein the formula provides that, at a second criteria, if the percentage is substantially 15% and the expired time is substantially 60 minutes, then new statistics are collected.

13. The apparatus of claim 12, wherein the formula varies linearly between the first criteria and the second criteria.

14. The apparatus of claim 8, wherein the new database statistics include one or more of: number of rows; number of blocks; a frequent values list; average row length; number of distinct values (NDV) in a column; number of nulls in a column; data distribution (histogram); number of leaf blocks; levels; clustering factor; I/O performance and utilization; CPU performance and utilization.

15. A program product stored on a storage medium for collecting database statistics, comprising:

program code configured upon execution thereof to:

calculate a level of staleness for data associated with a previous set of database statistics;

identify a time when the previous set of database statistics were collected; and determine whether to collect new database statistics based on the level of staleness and the time; and a computer readable recordable medium bearing the program code;

wherein the grogram code is further configured to:

determine a percentage of data that has changed in a database table;

determine how much time has expired since the time when the previous set of database statistics were collected; and apply a formula based on the percentage and how much time when determining to collect new database statistics, wherein the formula provides that as the time that has expired increases, the percentage decreases when determining whether to collect new database statistics.

* * * * *